US011140042B2

(12) United States Patent
Bitterfeld et al.

(10) Patent No.: US 11,140,042 B2
(45) Date of Patent: Oct. 5, 2021

(54) DICTIONARY-BASED SERVICE MAPPING

(71) Applicant: ServiceNow, Inc., Santa Clara, CA (US)

(72) Inventors: Robert Bitterfeld, Petach Tikva (IL); Aviya Aron, Shafir (IL); Asaf Garty, Sdei Hemed (IL); Bary Solomon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 33 days.

(21) Appl. No.: 16/575,155

(22) Filed: Sep. 18, 2019

(65) Prior Publication Data
US 2021/0083945 A1 Mar. 18, 2021

(51) Int. Cl.
G06F 15/16 (2006.01)
G06F 9/54 (2006.01)
H04L 29/06 (2006.01)
H04L 12/24 (2006.01)
G06F 16/953 (2019.01)
H04L 29/08 (2006.01)

(52) U.S. Cl.
CPC ............ H04L 41/12 (2013.01); G06F 16/953 (2019.01); H04L 67/10 (2013.01); H04L 67/34 (2013.01)

(58) Field of Classification Search
CPC ....................................................... H04L 41/12
USPC .......................................................... 709/223
See application file for complete search history.

(56) References Cited

U.S. PATENT DOCUMENTS

| 5,978,594 | A | 11/1999 | Bonnell |
| 6,321,229 | B1 | 11/2001 | Goldman |
| 6,609,122 | B1 | 8/2003 | Ensor |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |
| 7,617,073 | B2 | 11/2009 | Trinon |

(Continued)

Primary Examiner — Hamza N Algibhah
(74) Attorney, Agent, or Firm — Fletcher Yoder PC

(57) ABSTRACT

A computing system is disposed within a computational instance of a remote network management platform associated with a managed network. The computing system (i) performs a discovery process that identifies attributes of computing devices and software applications disposed within the managed network; (ii) stores, in a persistent storage of the computing system, the attributes that were identified; (iii) indexes the attributes that were stored in the persistent storage for searching; (iv) receives a configuration file for a particular software application; (v) uses a search engine to find matches between one or more terms in the configuration file and one or more of the attributes; (vi) based on the matches, defines an operational mapping between the particular software application and one or more of the computing devices or software applications of those disposed within the managed network; and (vii) stores, in the persistent storage, a representation of the operational mapping.

20 Claims, 10 Drawing Sheets

(56) References Cited

U.S. PATENT DOCUMENTS

| | | |
|---|---|---|
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,850,388 B2 * | 9/2014 | Stubbs .............. G06F 8/71 717/107 |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 10,225,160 B1 * | 3/2019 | Polinati ............ G06F 3/0482 |
| 10,291,478 B1 * | 5/2019 | Hosamani ......... H04L 41/0873 |
| 10,339,441 B2 * | 7/2019 | Jayaraman ............. G06F 17/11 |
| 10,491,692 B1 * | 11/2019 | Feiguine ............. H04L 67/16 |
| 10,686,667 B1 * | 6/2020 | Subramaniam ........ H04L 41/12 |
| 10,764,124 B1 * | 9/2020 | Ben Ari ............... H04L 67/16 |
| 2011/0055191 A1 * | 3/2011 | Bain ..................... G06F 16/83 707/706 |
| 2012/0198073 A1 * | 8/2012 | Srikanth ............... H04L 67/10 709/226 |
| 2014/0344418 A1 * | 11/2014 | Jones ................. H04L 41/0873 709/220 |
| 2016/0154801 A1 * | 6/2016 | Li ...................... G06F 17/3053 707/749 |
| 2016/0188730 A1 * | 6/2016 | Delli Santi .......... G06F 16/951 707/728 |
| 2016/0275139 A1 * | 9/2016 | Gandhe ............... G06F 16/242 |
| 2017/0060891 A1 * | 3/2017 | Ben-Tzur ............ G06F 16/951 |
| 2017/0272316 A1 * | 9/2017 | Johnson .............. H04L 67/141 |
| 2018/0107920 A1 * | 4/2018 | Jayaraman ............ G06F 17/11 |
| 2018/0123940 A1 * | 5/2018 | Rimar .................... H04L 45/02 |
| 2018/0137411 A1 * | 5/2018 | Jayaraman ............ G06N 20/00 |
| 2018/0322430 A1 * | 11/2018 | Guha ................. H04L 41/5074 |
| 2018/0324045 A1 * | 11/2018 | Grisco ............... H04L 41/0866 |
| 2018/0324054 A1 * | 11/2018 | Biran .................... H04L 41/22 |
| 2019/0116153 A1 * | 4/2019 | Deverakonda Venkata ................ H04L 67/02 |
| 2019/0243831 A1 * | 8/2019 | Rumiantsau ............ G10L 15/26 |
| 2019/0266268 A1 * | 8/2019 | Polinati ................ G06F 9/5061 |
| 2019/0268243 A1 * | 8/2019 | Blakeman ........... G06F 9/44505 |
| 2019/0268244 A1 * | 8/2019 | Blakeman ............. G06F 3/0481 |
| 2019/0272271 A1 * | 9/2019 | Bhattacharjee ..... G06F 16/2455 |
| 2019/0273665 A1 * | 9/2019 | Polinati .............. H04L 41/0803 |
| 2019/0303208 A1 * | 10/2019 | Koya ................... G06F 9/4881 |
| 2019/0310977 A1 * | 10/2019 | Pal ..................... G06F 16/2228 |
| 2019/0342323 A1 * | 11/2019 | Henderson ........... G06F 16/285 |
| 2019/0379590 A1 * | 12/2019 | Rimar .................. H04L 43/045 |
| 2020/0097472 A1 * | 3/2020 | Vertsel ............... G06F 16/2455 |
| 2020/0110823 A1 * | 4/2020 | Steuer ................. G06F 16/252 |
| 2020/0228414 A1 * | 7/2020 | Garty ..................... H04L 41/20 |
| 2020/0302020 A1 * | 9/2020 | Abu Asba ............. G06F 40/30 |
| 2020/0328951 A1 * | 10/2020 | Vishwakarma ......... G06F 9/547 |

* cited by examiner

|  | IP Address | Port | Application | Device |
|---|---|---|---|---|
| 702a → | 10.196.39.69 | 8005 | oradb | dbserver |
| 702b → | 10.196.39.209 | 3443 | openview | hpom9 |
| 702c → | 10.196.39.72 | 8005 | orcl | v-ubuntu-sb |
| 702d → | 10.196.39.70 | 1521 | oracleSid | 10.196.39.70 |
| 702e → | 10.196.39.149 | 3306 | sybaseDatabase | 10.196.39.149 |
| 702f → | 10.196.39.71 | 3306 | mysqlDirectDatabase | 10.196.39.71 |
| 702g → | 10.196.39.68 | 2433 | mssqlDB | 10.196.39.68 |
|  | 704 | 706 | 708 | 710 |

FIG. 7

DICTIONARY-BASED SERVICE MAPPING

BACKGROUND

A remote network management platform may take the form of a hosted environment that provides an application Platform-as-a-Service (aPaaS) to users, particularly to operators of a managed network such as an enterprise. The services provided may take the form of web-based portals and/or software applications that enterprises, and both internal and external users thereof, may access through computational instances of the remote network management platform.

In order for the remote network management platform to administer such services to the managed network, the remote network management platform may perform a discovery process that involves determining what computing devices and software applications are present in the managed network, as well as the operational relationships between the devices and applications.

SUMMARY

The embodiments herein use a dictionary-based service mapping technique to determine what computing devices and software applications are present in a managed network, as well as the operational relationships between the devices and applications. In some cases, a remote network management platform performs service mapping for a managed network by searching files disposed within the managed network according to a predefined set of rules that specify particular files to look for and particular text patterns to look for within those files. Relying solely on such a narrowly-tailored rule-based discovery process may be cumbersome, as the rules may need to be adapted for managed networks that use different technology variants.

The systems and methods disclosed herein help address these or other issues by allowing the remote network management platform to identify matches between terms in a dynamic searchable dictionary and terms in files disposed within the managed network without limiting the search to narrowly-tailored rules. To achieve this, the remote network management platform may perform an initial discovery process to identify attributes of computing devices and software applications of the managed network, and the remote network management platform may use those identified attributes to build the dynamic searchable dictionary. The remote network management platform may then extract search terms from various files associated with the computing devices and software applications of the managed network and match those search terms to terms in the dictionary. Responsive to finding a match, the remote network management platform may define an operational mapping between the device or application associated with the dictionary term and the device or application associated with the file from which the search terms were extracted.

Accordingly, a first example embodiment may involve a computing system disposed within a computational instance of a remote network management platform that is associated with a managed network, the computing system containing persistent storage and being configured to: (i) perform a discovery process that identifies attributes of computing devices and software applications disposed within the managed network, wherein the discovery process involves remotely accessing the computing devices; (ii) store, in the persistent storage, the attributes that were identified; (iii) cause the attributes that were stored in the persistent storage to be indexed for searching; (iv) receive a configuration file for a particular software application; (v) find, using a search engine, matches between one or more terms in the configuration file and one or more of the attributes; (vi) based on the matches, define an operational mapping between: (a) the particular software application, and (b) one or more of the computing devices or software applications of those disposed within the managed network; and (vii) store, in the persistent storage, a representation of the operational mapping.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts a set of configuration items of a managed network, in accordance with example embodiments.

DETAILED DESCRIPTION

Figure 1:
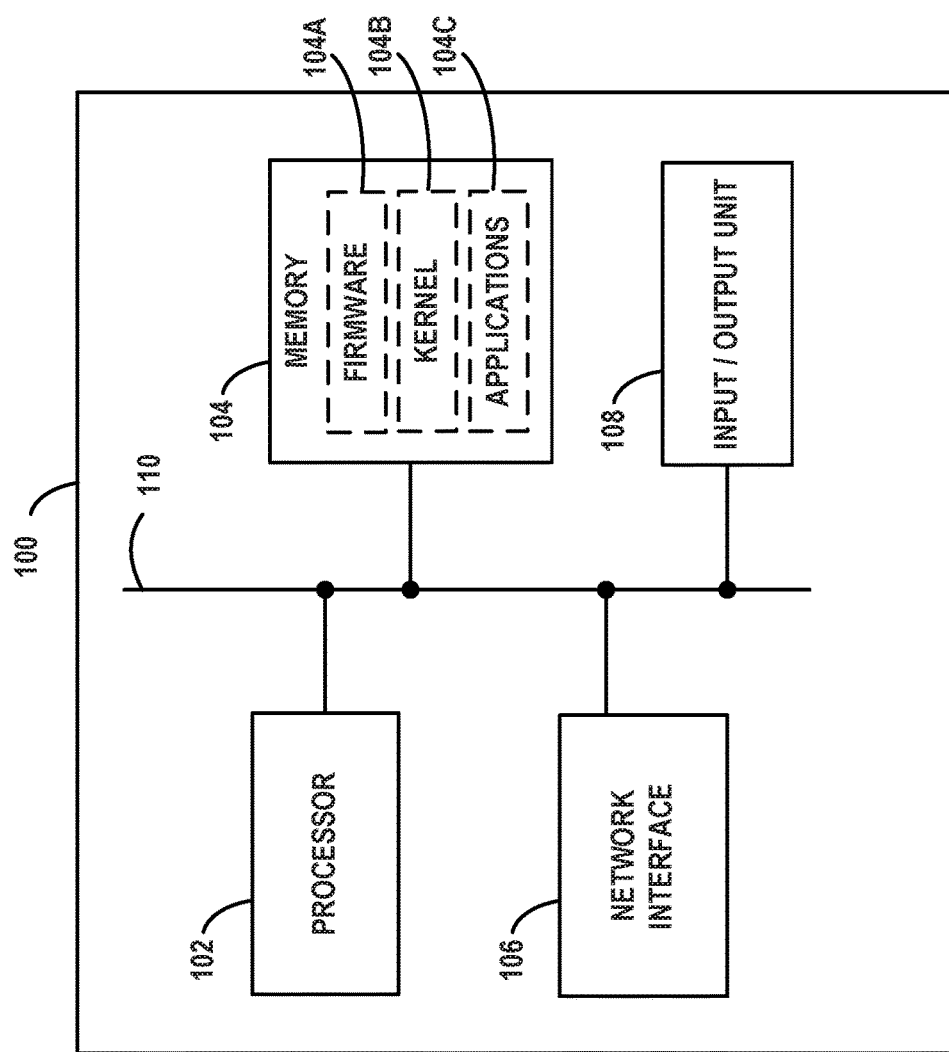
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
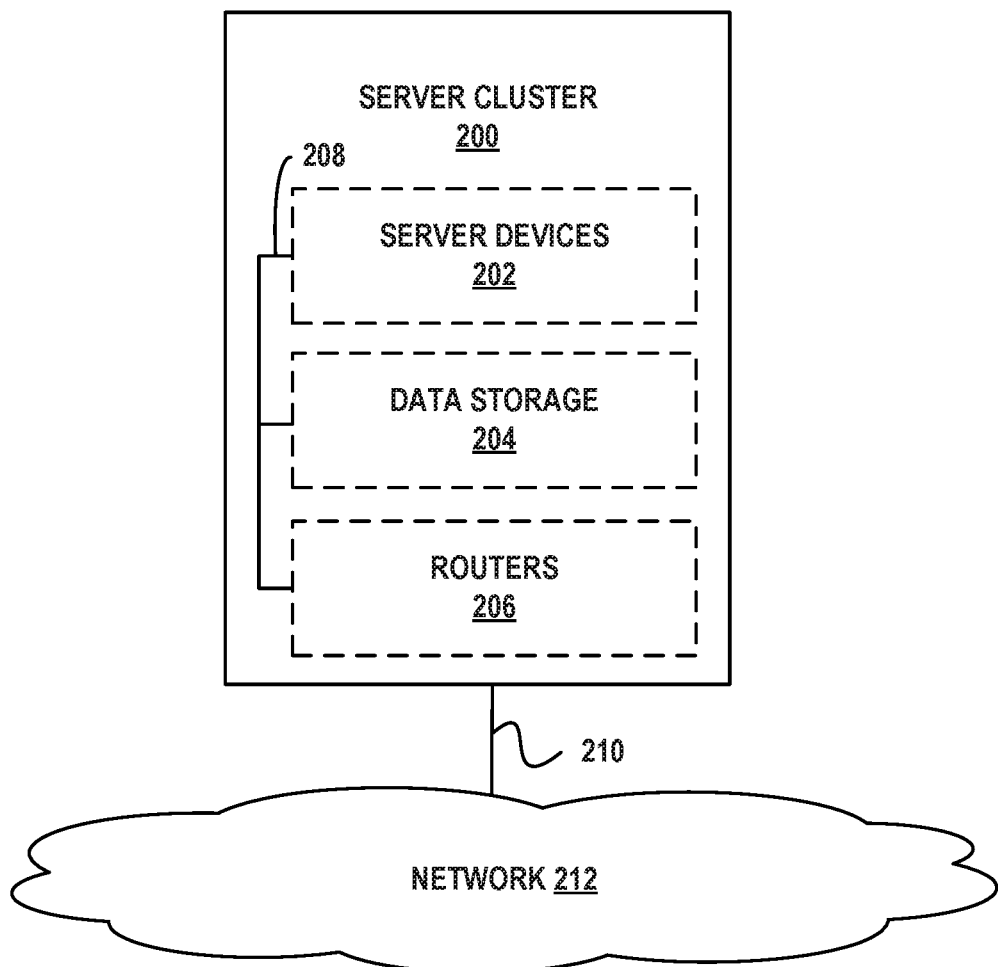
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
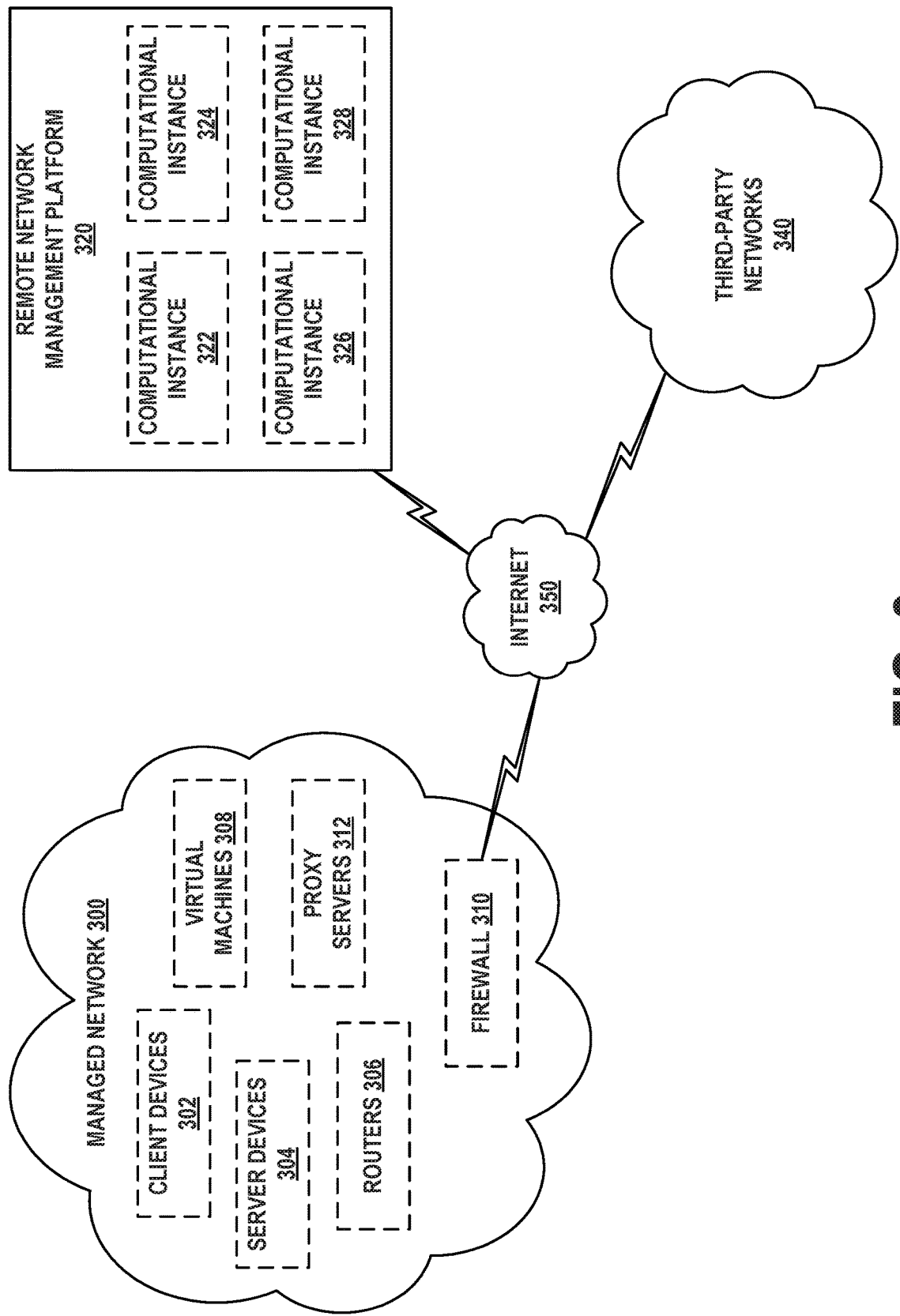
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
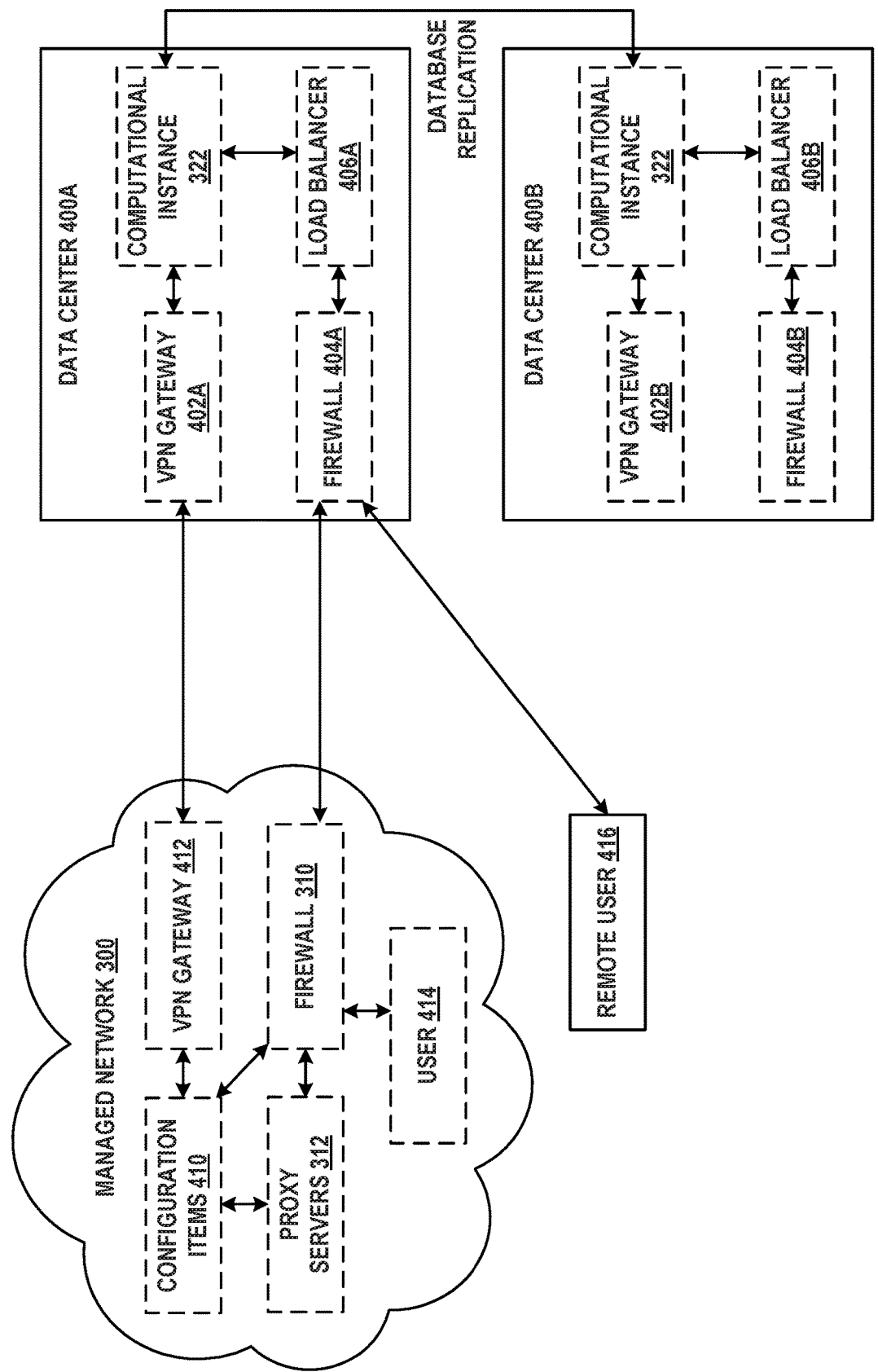
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
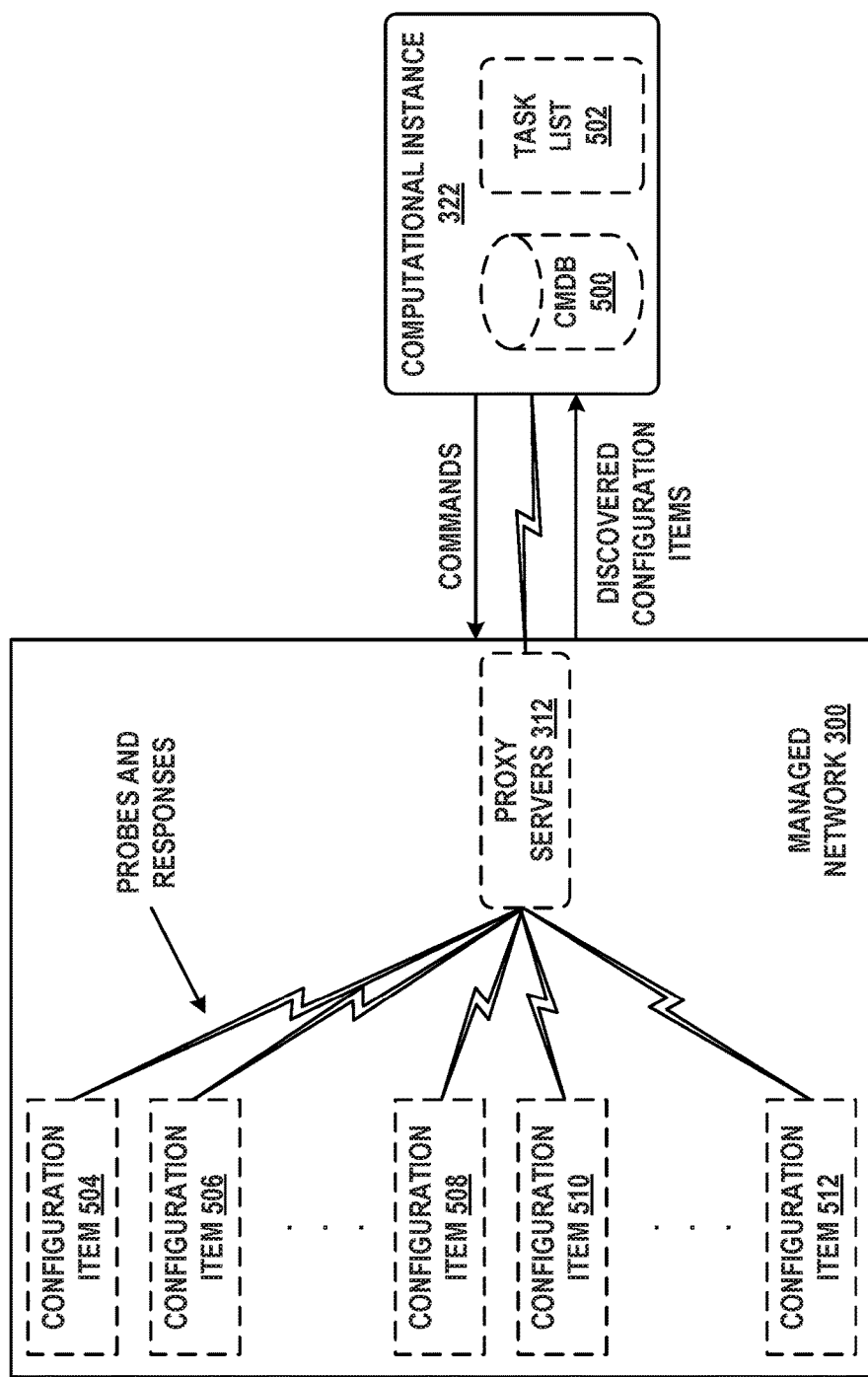
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this determination, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
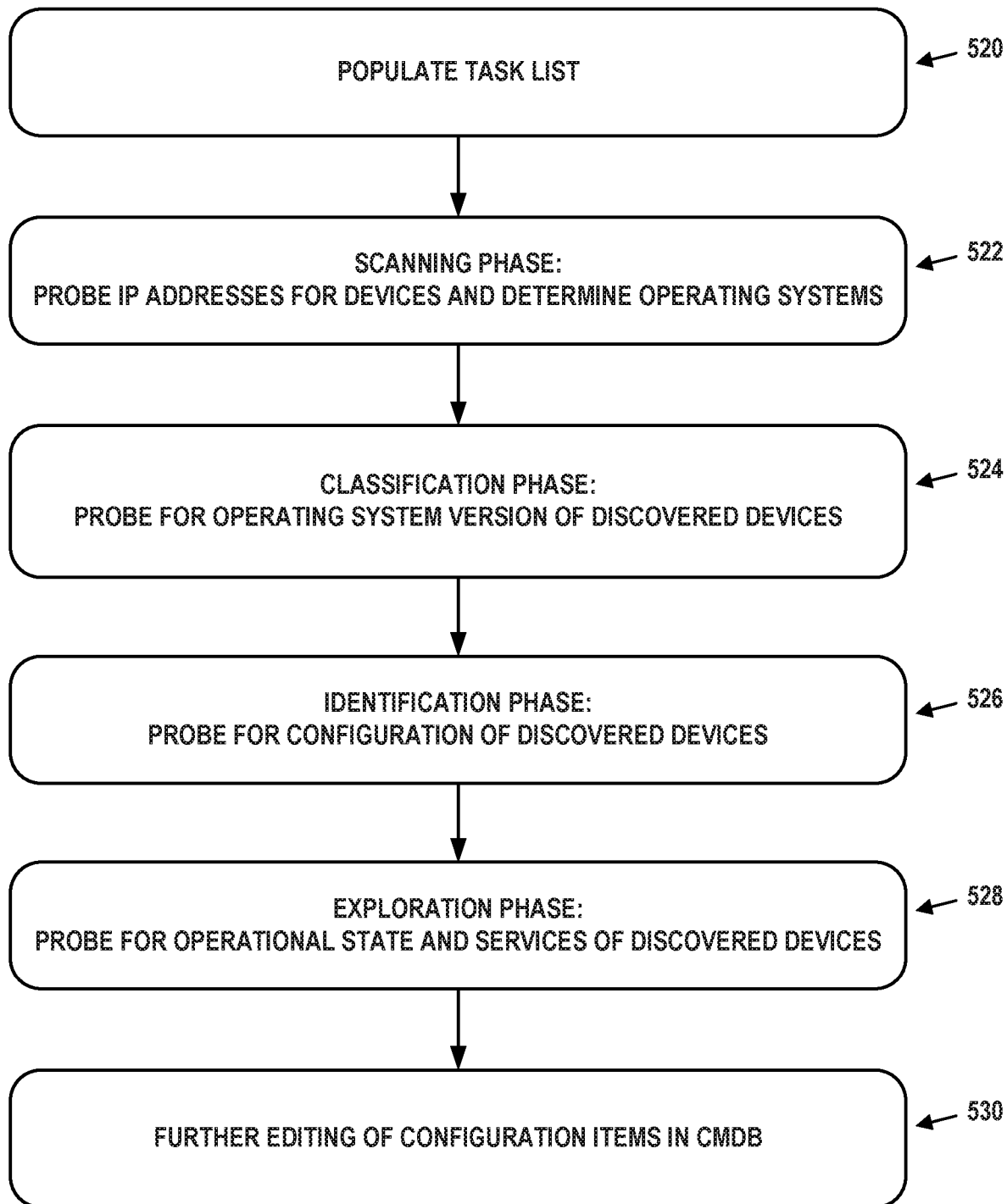
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Dictionary-Based Service Mapping

As described above, in order for remote network management platform 320 to administer the devices, applications, and services of managed network 300, remote network management platform 320 may perform a discovery process that involves determining what devices are present in managed network 300, as well as the applications and services provided by the devices. Once the devices and their provided applications and services are identified, remote network management platform 320 may determine the relationships between discovered devices, applications, and services in a process referred to as service mapping.

One way for remote network management platform 320 to perform service mapping is to search the identified devices and applications of managed network 300 for specific files and to parse those files using predefined rules to identify predefined text patterns. As described above in connection with FIGS. 5A and 5B, a computing device of a computational instance, such as computational instance 322, may perform the service mapping process.

Figure 6:
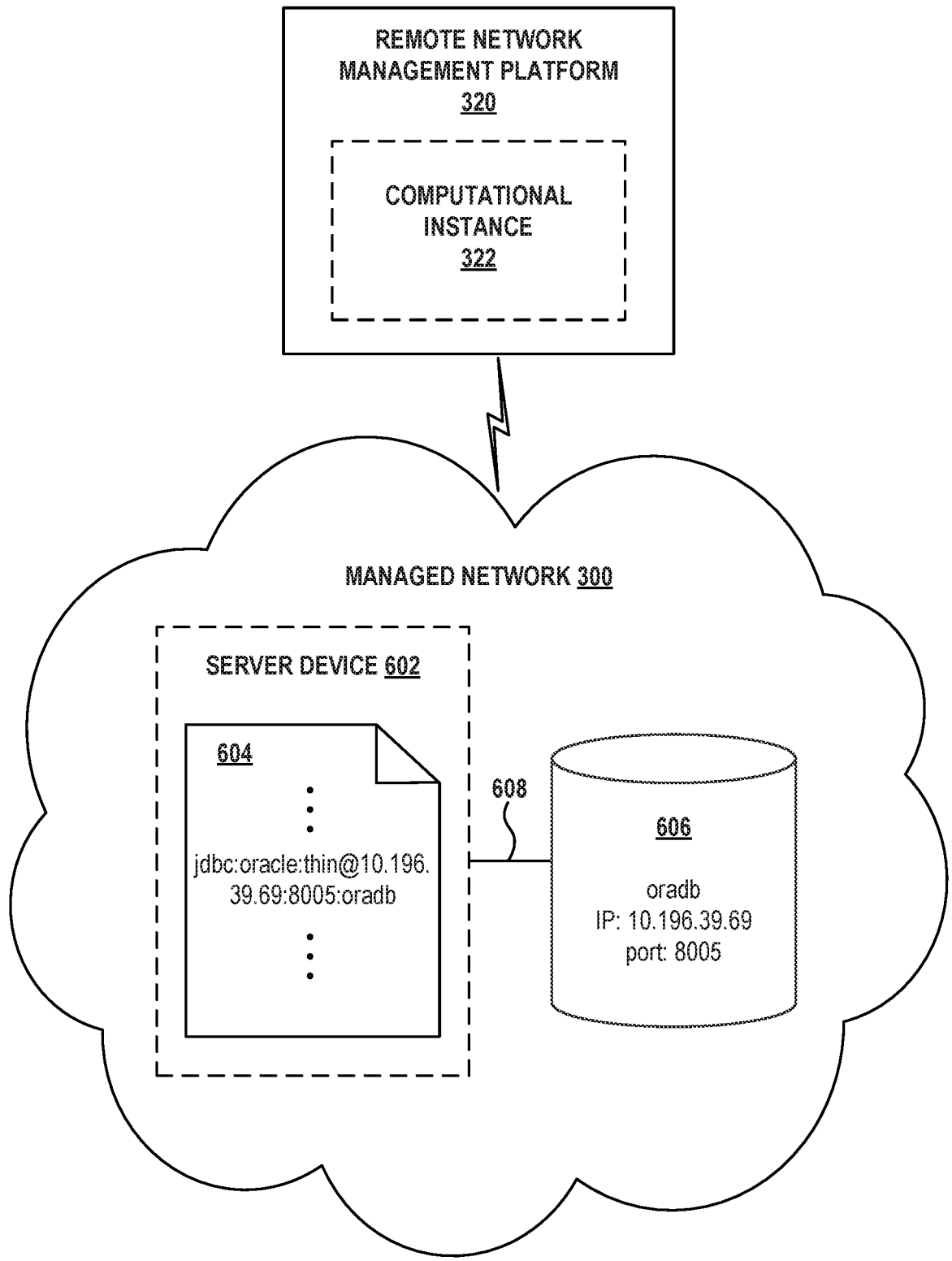
FIG. 6 depicts a communication environment involving a remote network management architecture, in accordance with example embodiments.

FIG. 6 depicts a particular example of service mapping for a server device 602 of managed network 300. When performing service mapping, remote network management platform 320 may search server device 602 for a particular file, such as servlet configuration file 604. Responsive to discovering servlet configuration file 604, remote network management platform 320 may parse the configuration file for predefined text patterns that are indicative of connections to or associations with other devices of managed network 300. The predefined text pattern may be a regular expression, or it could take on other forms as well.

In examples where server device 602 is an Apache HTTP Server running the Apache TOMCAT® servlet, remote network management platform 320 may parse configuration file 604 for a text pattern according to the following format:

jdbc:.*:.*:.*(.*)

where the text ".*" is a placeholder for text that may indicate one or more connections to server device 602. It should be understood that this example is for illustrative purposes only, and managed network 300 may include additional and/or different types of devices running additional and/or different types of applications.

As shown, configuration file 604 includes the text pattern "jdbc:oracle:thin:@10.196.39.69:8005:oradb," which remote network management platform 320 may discover while parsing configuration file 604 for the predefined text pattern above. Based on this discovered text pattern, remote network management platform 320 may determine an operational mapping of server device 602. The predefined text pattern identifies an IP address ("10.196.39.69"), a port number ("8005"), and database identifier ("oradb"). Based on this predefined text pattern, remote network management platform 320 may determine that server 602 interfaces with a database (shown as database 606) identified as oradb at the IP address 10.196.39.69 through port 8005. Accordingly, remote network management platform 320 may identify an operational connection 608 between server device 602 and database 606.

Remote network management platform 320 may similarly parse other configuration files stored on server device 602, as well as configuration files stored on other devices of managed network 300, for predefined text patterns that identify other connections among devices of managed network 300.

While the above-described service mapping technique may be useful for discovering connections between devices and applications of managed network 300 in some circumstances, there may be situations in which this technique has its drawbacks. In particular, the above technique involves searching for predefined files having predefined patterns of text, where the predefined files and text patterns depend on the types and versions of devices and applications of the managed network. As such, this service mapping technique may be tailored to work with a particular managed network, but it may not work with a different managed network that operates using different technology variants. Further, when an application or device of the managed network is updated or otherwise changed, remote network management platform 320 may also adjust the rules for which predefined files and text patterns are searched for in order to compensate for these changes. Accordingly, it may be desirable for remote network management platform 320 to use a service mapping technique that is more flexible and that does not rely on searching for predefined files and text patterns that depend on the particular technology of a managed network.

Dictionary-based service mapping is an example of a service mapping technique that may provide more flexibility than the above-described technique. Dictionary-based service mapping involves using discovered attributes of applications or devices of a managed network to generate an indexed dictionary of terms. The service mapping then involves identifying a configuration file of a particular application and matching terms in the configuration file to terms in the indexed dictionary. Based on any identified matches and the strength of those matches, an operational mapping between the particular application and one or more other applications or devices can be defined. The dictionary may be a dynamic dictionary that is generated based on preliminary discovery processes, as described in further detail below, such that the dictionary may adapt for a given managed network and account for technology variants or other changes to the managed network without having to alter rules associated with searching for predefined files and text patterns.

As described above in connection with FIGS. 5A and 5B, remote network management platform 320 may carry out a discovery process for identifying devices and applications of managed network 300, such as by probing IP addresses within a specified range of IP addresses, and storing details about the identified devices and applications as configuration items in CMDB 500.

FIG. 7 depicts a set of example configuration items 702 (identified individually as configuration items 702a, 702b, 702c, 702d, 702e, 702f, and 702g) that remote network management platform 320 may obtain and store as a result of performing some or all of the discovery processes described above in connection with FIGS. 5A and 5B. Each configuration item may be associated with a particular device or application disposed within, or otherwise associated with, managed network 300 and may include identifying information about the particular device or application. As shown, each configuration item includes an IP address 704, a port number 706, an application identifier 708, and a device identifier 710 (which may be a name assigned to a device, or may be a network address, such as the IP address, of the device). However, the configuration items are not limited to this format and may include additional, fewer, and/or different attributes in other examples.

Remote network management platform 320 may index some or all of the data in the configuration items 702 into a searchable dictionary for use in the keyword-based service mapping process. In some examples, remote network management platform 320 may use an external device or system to index the data in the configuration items 702. For instance, remote network management platform 320 may upload the data to a cloud-based search engine, such as the AMAZON WEB SERVICES® search engine, and the cloud-based search engine may index the data for searching. The data may be indexed into the searchable dictionary according to various indexing techniques now known or later developed. In any case, the searchable dictionary may associate together any data from the same configuration item. For instance, referring to FIG. 7, the searchable dictionary may associate the terms "10.196.39.69," "8005," "oradb," and "dbserver" with one another because they are each included in configuration item 702a.

Once the data in the configuration items 702 has been indexed into the searchable dictionary, remote network management platform 320 may use the indexed data to identify operational mappings between applications or devices of managed network 300. To do so, remote network management platform 320 may access a configuration file of an application of interest and search the indexed data for matches between one or more terms in the configuration file and one or more terms in the indexed data.

Remote network management platform 320 may access the configuration file in various ways. For instance, remote network management platform 320 may be configured to access one or more of the configuration files that are identified during some or all of the discovery processes described above in connection with FIGS. 5A and 5B. Alternatively, a user of managed network 300 may provide user input identifying a particular configuration file to remote network management platform 320, and remote network management platform 320 may access the user-identified configuration file.

Configuration files for applications may include data that is useful for identifying operational mappings for the applications. For example, given an application configured to run on a particular device, the configuration file for the application may include information identifying the device and/or a network location of the device. And remote network management platform 320 may use this information in the configuration file to identify operational mappings for the application.

In practice, remote network management platform 320 may parse the configuration file to retrieve one or more terms from the file. In some examples, this may involve tokenizing the data in the configuration file into tokens, such as by using a predefined tokenization scheme to classify certain patterns of text as separate terms. For instance, when tokenizing the data, remote network management platform 320 may filter out certain stop words from the configuration file. Stop words may include any text that is unlikely to represent an operational mapping for the configuration file, such as generic terms that commonly appear across multiple configuration files. Further, remote network management platform 320 may classify text that is separated by special characters, such as spaces, colons, semicolons, or various symbols, into different terms and may disregard the special characters. Using configuration file 604 as an example, remote network management platform 320 may tokenize the text "jdbc:oracle:thin@10.196.39.69:8005:oradb" into the following terms: "jdbc," "oracle," "thin," "10.196.39.69," "8005," and "oradb."

In some examples, remote network management platform 320 may retrieve terms only from a portion of the configuration file. While, as noted above, the configuration file may include data that is useful for identifying operational mappings for the applications, the configuration file may also include data that is not useful for identifying operational mappings, such as any data that does not reference other devices or applications in managed network 300. Therefore, it may be beneficial to consider the useful information in the configuration file while ignoring the other information, which remote network management platform 320 may accomplish by retrieving terms only from the portion of the configuration file that includes the useful information. The location of the useful information in the configuration file may vary based on the type of the configuration file. For example, JSON configuration files may arrange the useful information in one manner, while XML, configuration files may arrange the useful information in another manner. As such, remote network management platform 320 may be configured to determine a type of the configuration file and, based on the determined type, select a particular portion of the configuration file from which to retrieve and tokenize the terms.

Once remote network management platform 320 has tokenized data from the configuration file into terms, remote network management platform 320 may perform dictionary-based service mapping by searching the dictionary, which includes indexed data from configuration items 702, for matches with the tokenized terms. Remote network management platform 320 may use a search engine to search for the matches. The search engine may be implemented within remote network management platform 320, or it may be an external cloud-based search engine, such as Amazon Cloud-Search, which operates in the AMAZON WEB SERVICES® cloud.

Continuing to use configuration file 604 as an example, searching the dictionary for matches with the tokenized terms of configuration file 604 yields matches for the terms "10.196.39.69," "8005," and "oradb." As noted above, the dictionary may associate certain indexed data together based on the indexed data originating from the same configuration item. As such, the search engine can use these associations to determine to which configuration item (and/or which device or software application associated with the configuration item) the matched terms correlate. In the present example, for instance, the search engine may determine that the terms "10.196.39.69," "8005," and "oradb" correlate to terms from configuration item 702a. In particular, the search engine may determine that these terms correlate to the IP address 704, port number 706, and application identifier 708 of configuration item 702a. Similarly, the search engine may determine that the term "8005" correlates to a term from configuration item 702c, namely the port number 706 of configuration item 702c.

Figure 8:
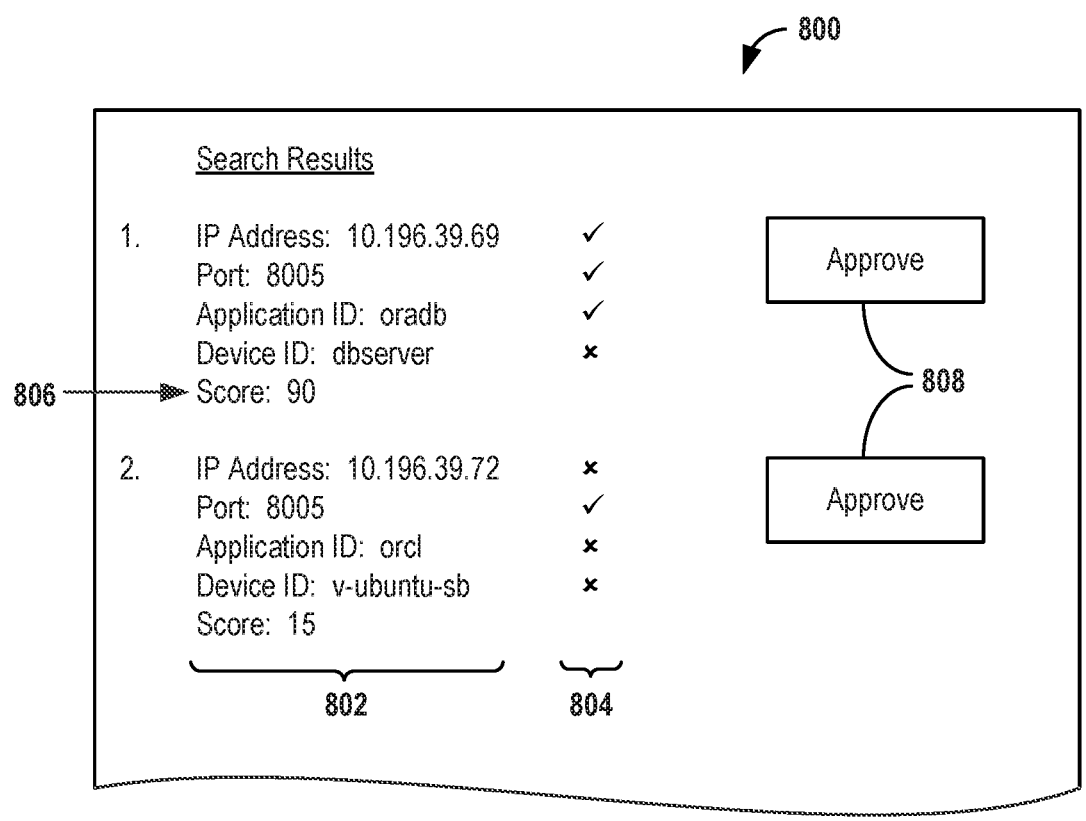
FIG. 8 depicts a search result output using dictionary-based service mapping, in accordance with example embodiments.

Remote network management platform 320 may be configured to output an indication of the search results, such as by causing a computing device of managed network 300 to display the search results via a user interface of the computing device. FIG. 8 illustrates an example search result output 800. As shown, the search results 800 include a listing 802 of configuration items for which a match was found, as well as match indicators 804 indicating the data in each configuration for which the match was found. In the present example, match indicators 804 indicate a match with a check mark and no match with an "x," but other indicators may be used as well. For the first configuration item in the listing 802, which corresponds to configuration item 702a, the match indicators 804 indicate a match for the IP address, the port number, and the application identifier, and the match indicators 804 indicate no match for the device identifier, in accordance with the search results described above. Similarly, for the second configuration item in the listing 802, which corresponds to configuration item 702c, the match indicators 804 indicate a match for the port number, and the match indicators 804 indicate no match for the IP address, application identifier, and device identifier.

The search results 800 may further include confidence scores 806 for each configuration item in the listing 802. A higher confidence score 806 for a configuration item may indicate a stronger likelihood that there is an operational relationship between the configuration item and the configuration file from which the tokenized search terms were obtained, and a lower confidence score 806 may indicate that the presence of an operational relationship is less likely.

The search engine may determine the confidence scores 806 based on an extent of term matches found. For instance, if the search engine finds a high number of matches between the terms in the configuration file and the dictionary terms associated with a particular configuration item, then the search engine may assign a high confidence score to that configuration item. Conversely, if the search engine finds a low number of matches between the terms in the configuration file and the dictionary terms associated with a particular configuration item, then the search engine may assign a low confidence score to that configuration item. As shown, the search engine found three matches with terms in configuration item 702a, so the search engine assigned a confidence score of 90 (out of 100) to that configuration item, while the search engine assigned a confidence score of 15 to configuration item 702c, for which the search engine only found one match.

In some examples, the search engine may use additional or different parameters to determine the confidence score, such as a distance (e.g., how many characters or terms) between the matched terms in the configuration file. For instance, given that the terms "10.196.39.69," "8005," and "oradb" are closely positioned together in configuration file 604, the search engine may assign a higher confidence score to configuration item 702a than it would if the terms were positioned farther apart. As another example, the search engine may determine the confidence score based on the type of matched or unmatched terms. The presence or absence of certain types of terms in the configuration file may carry more weight than for other types of terms. For instance, matching a device or application identifier may be a strong indicator of an operational relationship between the configuration file and the device or application corresponding to the identifier, while matching a port number may carry less weight, as the same port number may be used across different applications. Similarly, failing to match a device or application identifier may strongly indicate the lack of an operational relationship, while failing to match a port number may weakly indicate the lack of an operational relationship. As such, the search engine may adjust the confidence score more drastically based on matching or failing to match a device or application identifier than it would based on matching or failing to match a port number. Other examples are possible as well.

Based on the search results 800, remote network management platform 320 may define an operational mapping for the configuration file and/or for an application that uses the configuration file. For instance, responsive to finding matches between terms in the configuration file and terms in a configuration item, remote network management platform 320 may define an operational mapping between (i) the configuration file and/or an application or device that uses the configuration file and (ii) the configuration item and/or the application or device associated with the configuration item. In connection with FIGS. 6-8, for instance, remote network management platform 320 may define an operational mapping indicating that the device or application associated with configuration file 604 is operationally connected to the oradb database on dbserver at the IP address 10.196.39.69 through port 8005.

For each defined operational mapping, remote network management platform 320 may store the defined operational mapping in a persistent storage, such as in CMDB 500. Remote network management platform 320 may repeat this dictionary-based service mapping process for various other configuration files associated with the devices and/or applications of managed network 300 as well, thereby defining additional operational mappings and storing the mappings in the persistent storage. As a result, the persistent storage may include a number of operational mappings indicating which and how various devices and/or applications of managed network 300 are operationally connected.

In some examples, remote network management platform 320 may consider the confidence score of a search result when defining or determining whether to store an operational mapping. As noted above, the confidence score may indicate whether matched terms correspond to a legitimate operational relationship or instead correspond to a false positive. As such, remote network management platform 320 may be configured to define and/or store operational mappings only for search results that have a sufficiently high confidence score. For instance, if one search result has a confidence score above a threshold value, then remote network management platform 320 may define and store an operational mapping for that search result. And if another search result has a confidence score below the threshold value, then remote network management platform 320 may refrain from defining and/or storing an operational mapping for that search result.

In some examples, remote network management platform may prompt a user to approve an operational mapping. FIG. 8 further illustrates an example of this approval process. As shown, the search result output 800 may display selectable approval icons 808 corresponding to each search result in the listing 802. In practice, a user of managed network 300 may review the search results to evaluate whether each result corresponds to a legitimate operational relationship or a false positive. If the user recognizes a legitimate operational relationship, then the user may select the corresponding approval icon 808, and remote network management platform 320 may responsively define and store the operational mapping. In some examples, remote network management platform 320 may only display approval icons 808 for search results that have a confidence score below a threshold value, while automatically defining and storing operational relationships for search results that have a confidence score above the threshold value.

The above-described dictionary-based service mapping can be advantageous over other service mapping techniques because, unlike the service mapping techniques described above that involve searching for specific text patterns within specific configuration files, dictionary-based service mapping does not involve such rigid search parameters. Rather, dictionary-based service mapping can identify operational mappings using the text of a configuration file regardless of the order or pattern of the text.

VI. Example Operations

Figure 9:
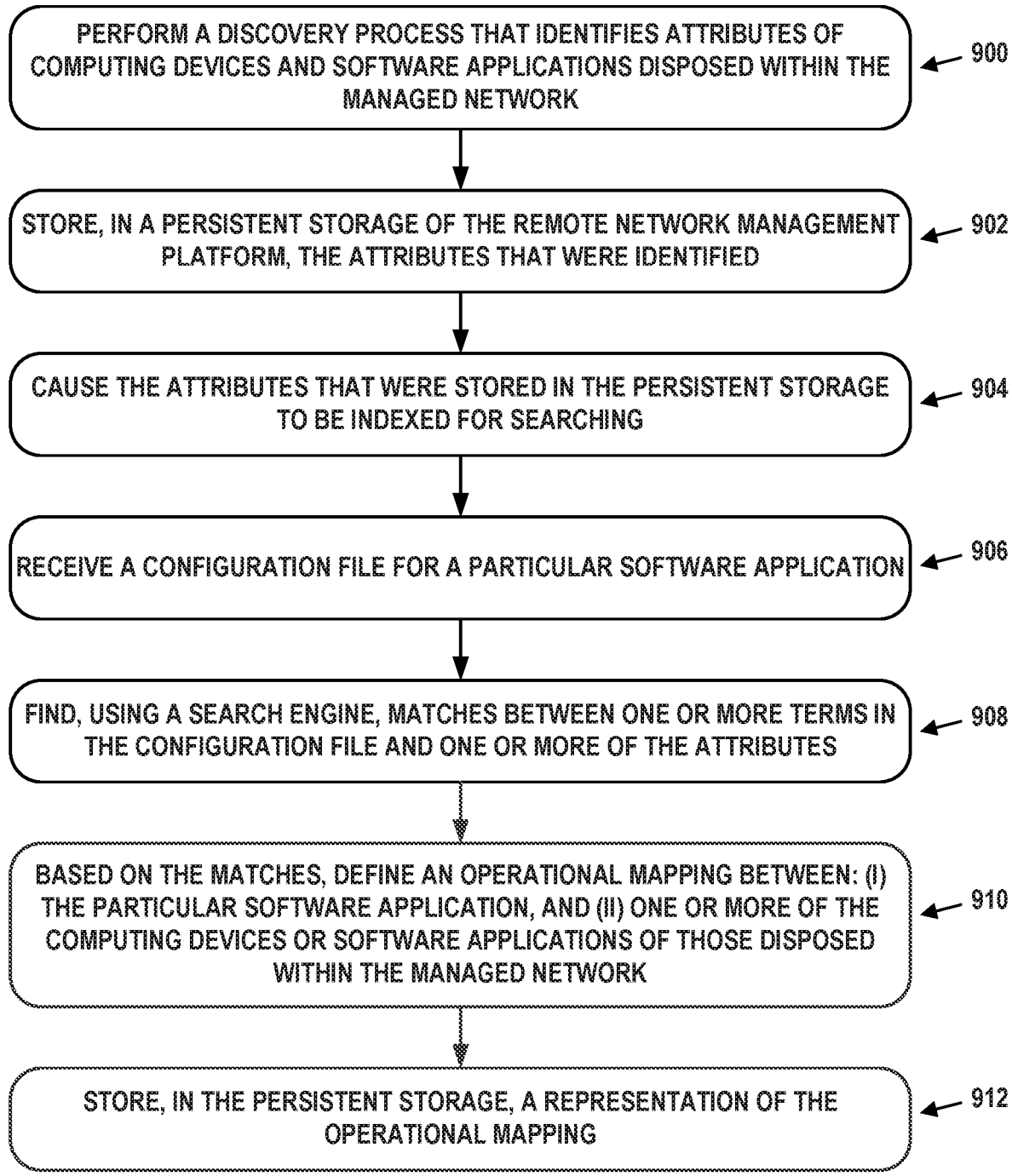
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

The embodiments of FIG. 9 may be carried out in connection with a computing system disposed within a computational instance of a remote network management platform that is associated with a managed network. The computing system may contain a persistent storage, such as a CMDB, and may be configured to carry out the operations described in connection with the embodiments of FIG. 9.

Block 900 may involve the computing system performing a discovery process that identifies attributes of computing devices and software applications disposed within the managed network. In line with the discussion above in connection with FIGS. 5A and 5B, the discovery process may involve remotely accessing the computing devices, and the identified attributes may include the configuration items discovered during that process.

Block 902 may involve the computing system storing, in the persistent storage of the remote network management platform, the attributes that were identified.

Block 904 may involve the computing system causing the attributes that were stored in the persistent storage to be indexed for searching. In line with the discussion above, this may involve the computing system indexing the attributes or causing a cloud-based search engine to index the attributes.

Block 906 may involve the computing system receiving a configuration file for a particular software application. As discussed above, the computing system may receive the configuration file as a result of performing the discovery process or based on user input from a user of the managed network.

Block 908 may involve the computing system finding, using a search engine, matches between one or more terms in the configuration file and one or more of the attributes.

Block 910 may involve the computing system defining, based on the matches, an operational mapping between: (i) the particular software application and (ii) one or more of the computing devices or software applications of those disposed within the managed network.

Block 912 may involve the computing system storing, in the persistent storage, a representation of the operational mapping.

In some embodiments, the computing system is further configured to determine a type of the configuration file and use the type of the configuration file as a basis for selecting a portion of the configuration file. Further, in some embodiments, tokenizing the configuration file involves filtering out one or more stop words from the configuration file. In these embodiments, finding the matches between one or more terms in the configuration file and one or more of the attributes involves finding matches between one or more terms in the portion of the configuration file and one or more of the attributes.

In some embodiments, the computing system is further configured to tokenize the configuration file into a plurality of tokens. In these embodiments, finding matches between one or more terms in the configuration file and one or more of the attributes involves finding matches between one or more of the tokens and one or more of the attributes.

In some embodiments, indexing the attributes that were stored in the persistent storage involves using a cloud-based search engine to index the attributes that were stored in the persistent storage. Further, in these embodiments, finding matches between one or more terms in the configuration file and one or more of the attributes involves using the cloud-based search engine to find the matches between one or more terms in the configuration file and one or more of the attributes.

In some embodiments, the computing system is further configured to determine a confidence value of the operational mapping. In these embodiments, storing the representation of the operational mapping may involve storing the representation of the operational mapping based on the determined confidence value.

In some embodiments, the computing system is further configured to determine that the confidence value of the operational mapping is above a threshold confidence value. In these embodiments, storing the representation of the operational mapping may involve storing the representation of the operational mapping based on the confidence value being above the threshold confidence value.

In some embodiments, the computing system is further configured to determine that the confidence value of the operational mapping is above a threshold confidence value and store the representation of the operational mapping based on the confidence value being above the threshold confidence value.

In some embodiments, the computing system is further configured to determine that the confidence value of the operational mapping is below a threshold confidence value and prompt a user of the managed network to approve the operational mapping based on the determined confidence value being below the threshold confidence value.

In some embodiments, the computing system may cause a proxy server of the managed network to perform some or all of the processes depicted by blocks 900, 902, 904, 906, 908, 910, and 912.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system disposed within a computational instance of a remote network management platform that is associated with a managed network, the computing system containing a persistent hardware storage and a hardware processor, wherein the computing system is configured to:

perform a discovery process that identifies attributes of computing devices and software applications disposed within the managed network, wherein the discovery process involves remotely accessing the computing devices;

store, in the persistent hardware storage, the attributes that were identified;

index the attributes that were stored in the persistent hardware storage into a set of indexed data;

request a configuration file for a particular software application identified during the discovery process, or identified via user input, or both;

receive the configuration file for the particular software application disposed in the managed network;

find, using a search engine, matches between one or more terms in the configuration file and one or more of the attributes in the set of indexed data;

based on the matches, define an operational mapping between: (i) the particular software application, and (ii) one or more of the computing devices or software applications of those disposed within the managed network; and store, in the persistent hardware storage, a representation of the operational mapping.

2. The computing system of claim 1, wherein the computing system is configured to:

determine a type of the configuration file; and use the type of the configuration file as a basis for selecting a portion of the configuration file, wherein finding the matches between one or more terms in the configuration file and one or more of the attributes comprises finding matches between one or more terms in the portion of the configuration file and one or more of the attributes.

3. The computing system of claim 1, wherein the computing system is configured to:
tokenize the configuration file into a plurality of tokens, wherein finding matches between one or more terms in the configuration file and one or more of the attributes comprises finding matches between one or more of the tokens and one or more of the attributes.

4. The computing system of claim 3, wherein tokenizing the configuration file comprises filtering out one or more stop words from the configuration file, and wherein the one or more stop words comprise generic terms unlikely to indicate the operational mapping.

5. The computing system of claim 1, wherein indexing the attributes that were stored in the persistent hardware storage comprises using a cloud-based search engine to index the attributes that were stored in the persistent hardware storage, and wherein finding matches between one or more terms in the configuration file and one or more of the attributes comprises using the cloud-based search engine to find the matches between one or more terms in the configuration file and one or more of the attributes.

6. The computing system of claim 1, wherein the computing system is configured to:
determine a confidence value of the operational mapping, wherein the computing system stores the representation of the operational mapping based on the determined confidence value.

7. The computing system of claim 6, wherein the computing system is configured to:
determine that the confidence value of the operational mapping is above a threshold confidence value, wherein the computing system stores the representation of the operational mapping based on the confidence value being above the threshold confidence value.

8. The computing system of claim 6, wherein the computing system is configured to:
determine that the confidence value of the operational mapping is below a threshold confidence value; and
prompt a user of the managed network to approve the operational mapping based on the determined confidence value being below the threshold confidence value.

9. A method involving a computational instance of a remote network management platform that is associated with a managed network, the method comprising:
performing a discovery process that identifies attributes of computing devices and software applications disposed within the managed network, wherein the discovery process involves remotely accessing the computing devices;
storing, in a persistent hardware storage of the remote network management platform, the attributes that were identified;
indexing the attributes that were stored in the persistent hardware storage into a set of indexed data;
requesting a configuration file for a particular software application identified during the discovery process, or identified via user input, or both;
receiving the configuration file for the particular software application disposed in the managed network;
finding, using a search engine, matches between one or more terms in the configuration file and one or more of the attributes in the set of indexed data;
based on the matches, defining an operational mapping between: (i) the particular software application, and (ii) one or more of the computing devices or software applications of those disposed within the managed network; and
storing, in the persistent hardware storage, a representation of the operational mapping.

10. The method of claim 9, comprising:
determining a type of the configuration file; and
using the type of the configuration file as a basis for selecting a portion of the configuration file, wherein finding the matches between one or more terms in the configuration file and one or more of the attributes comprises finding matches between one or more terms in the portion of the configuration file and one or more of the attributes.

11. The method of claim 9, comprising:
tokenizing the configuration file into a plurality of tokens, wherein finding matches between one or more terms in the configuration file and one or more of the attributes comprises finding matches between one or more of the tokens and one or more of the attributes.

12. The method of claim 11, wherein tokenizing the configuration file comprises filtering out one or more stop words from the configuration file, and wherein the one or more stop words comprise generic terms unlikely to indicate the operational mapping.

13. The method of claim 9, wherein indexing the attributes that were stored in the persistent hardware storage comprises using a cloud-based search engine to index the attributes that were stored in the persistent hardware storage, and wherein finding matches between one or more terms in the configuration file and one or more of the attributes comprises using the cloud-based search engine to find the matches between one or more terms in the configuration file and one or more of the attributes.

14. The method of claim 9, comprising:
determining a confidence value of the operational mapping; and
determining that the confidence value of the operational mapping is above a threshold confidence value, wherein storing the representation of the operational mapping comprises storing the representation of the operational mapping based on the confidence value being above the threshold confidence value.

15. The method of claim 9, comprising:
determining a confidence value of the operational mapping;
determining that the confidence value of the operational mapping is below a threshold confidence value; and
prompt a user of the managed network to approve the operational mapping based on the determined confidence value being below the threshold confidence value.

16. An article of manufacture including a non-transitory computer-readable medium, having stored thereon program instructions that, upon execution by a computing system, cause the computing system to perform operations comprising:
performing a discovery process that identifies attributes of computing devices and software applications disposed within a managed network, wherein the discovery process involves remotely accessing the computing devices;

storing, in a persistent hardware storage of the computing system, the attributes that were identified;

indexing the attributes that were stored in the persistent hardware storage into a set of indexed data;

requesting a configuration file for a particular software application identified during the discovery process, or identified via user input, or both;

receiving the configuration file for the particular software application disposed in the managed network;

finding, using a search engine, matches between one or more terms in the configuration file and one or more of the attributes in the set of indexed data;

based on the matches, defining an operational mapping between: (i) the particular software application, and (ii) one or more of the computing devices or software applications of those disposed within the managed network; and storing, in the persistent hardware storage, a representation of the operational mapping.

17. The article of manufacture of claim 16, the operations comprising:

determining a type of the configuration file; and using the type of the configuration file as a basis for selecting a portion of the configuration file, wherein finding the matches between one or more terms in the configuration file and one or more of the attributes comprises finding matches between one or more terms in the portion of the configuration file and one or more of the attributes.

18. The article of manufacture of claim 16, the operations comprising:

tokenizing the configuration file into a plurality of tokens, wherein finding matches between one or more terms in the configuration file and one or more of the attributes comprises finding matches between one or more of the tokens and one or more of the attributes.

19. The article of manufacture of claim 18, wherein tokenizing the configuration file comprises filtering out one or more stop words from the configuration file, and wherein the one or more stop words comprise generic terms unlikely to indicate the operational mapping.

20. The article of manufacture of claim 16, wherein indexing the attributes that were stored in the persistent hardware storage comprises using a cloud-based search engine to index the attributes that were stored in the persistent hardware storage, and wherein finding matches between one or more terms in the configuration file and one or more of the attributes comprises using the cloud-based search engine to find the matches between one or more terms in the configuration file and one or more of the attributes.

* * * * *